Patented Nov. 8, 1938

2,135,592

UNITED STATES PATENT OFFICE 2,135,592

SOY BEAN NUTS

Rollin H. Moulton, Western Springs, Ill., assignor to Soy Bean Products Co., Chicago, Ill., a corporation of Illinois No Drawing. Application January 27, 1937, Serial No. 122,570

13 Claims. (Cl. 99—98)

This invention pertains to soy bean nuts, and more particularly to a method for processing soy beans to produce palatable nuts or nut products.

There have been numerous attempts heretofore to make nuts from soy beans, but the products thus made have not been palatable and have retained the bitter taste characteristic of soy beans. Other attempts have been made to produce a proper soy bean flour, and to produce soy bean nuts for other uses, but with no uniformity of result.

It is therefore an object of this invention to provide a process which will produce a uniformly palatable nut or nut product.

Another object is to provide a process for wholly removing the disagreeable tastes from soy beans in the process of making soy bean nuts.

Yet another object is to provide an inexpensive process for producing a nut delicacy from soy beans having a high food value and a high vitamin content.

A further object is to provide a salted soy bean nut which may be processed to any desired nut flavor.

A still further object is to provide a soy bean nut which may be used either alone or in combination with other food products, such as in bread or in candy fillings.

A yet further object is to provide a soy bean nut in which the freshness of the nut and the flavor thereof are retained indefinitely, even after the container has been opened.

With these and various other objects in view, the invention may consist of certain novel features as will be more fully described and particularly pointed out in the specification and claims appended hereto.

In practicing the invention contemplated herein of producing a desirable soy bean nut, a suitable quantity of soy beans is placed in large vessels, preferably non-metallic crocks and enough brine is added so that the beans will swell to substantially twice their normal size. The brine, or sodium chloride solution, is preferably one of from 5% to 20%, depending upon the use for which the nuts are intended. It has been found that where the nuts are to be eaten as nuts or a confection, a solution of about 20% is used. For use with other products, however, particularly where it is not known where the nut is to be ultimately used, or where the nut is to be used in bread making, or where a nut flavor or color is to be imparted to the soy bean nut, such as pistachio, etc., to be used in ice cream, etc., it has been found that a 10% solution is satisfactory, and the flavor and color are introduced in this soaking process. Where a nut is to be made where the salt flavor is imperceptible, that is, where a so-called unsalted nut is to be produced, a 5% solution is used.

The temperature of the added brine is substantially room temperature, that is, substantially 71° F. and the beans are soaked a sufficient time to absorb 120% brine by weight. The time necessary for this absorption is substantially from 15 hrs. to 24 hrs. This time could be decreased or increased by utilizing a hotter or colder solution. However, it is not desirable to soak the beans for too long a period of time as the cost of the final product would be increased, nor is it desirable to increase the cost by providing means for heating the solution. In no case should a solution be used which is above boiling point or below freezing.

After the beans have been soaked in the brine a sufficient time, the beans are drained until they are thoroughly dry, and are then placed in a deep fat fryer containing cocoanut oil, or other suitable oil such as a nut oil. The temperature of the cocoanut oil at the time that the beans are immersed is from 400° F. to 410° F. Where other oils are used, such as peanut oil, that is, a lower flash point oil, the temperature must be reduced. This, however, is not desirable, as it is found that the quicker the moisture is driven out of the beans at this time, the better the ultimate product, so cocoanut oil is preferable. After the introduction of the beans in the oil, the temperature of the oil drops quickly to a rather low one, depending upon the amount of beans to be processed.

The temperature of the oil is then raised to such a point that the beans contain only between 2% and 3% moisture. If more than 3% moisture is present, the product is tough. If less than 2%, the product is burned. It has been found that the temperature to which the beans should be raised is substantially 350° F., where a commercial quantity of beans such as 100 lbs. is handled. It is appreciated that if only a small quantity of beans is placed in the oil at 410° F. there would be substantially no decrease in the temperature. Therefore, in general it may be said that the important consideration is that the amount of moisture in the beans be reduced from 120% to between 2% and 3%. Also, it has been found that the moisture should be removed from the beans as quickly as possible without burning them. The time required for the temperature to build up again to a point where the moisture is removed to decrease it to the required amount, varies with the quantity of beans, and is substantially 8 min. and 18 min. where 50 lbs. and 100 lbs. of beans are used. The beans are not removed until the moisture is reduced the required amount, that is, to between 2% and 3%.

A suitable flavoring material may be added while the beans are being fried. Such a flavor must of course be oil soluble. In the process, regardless of whether another nut flavor is used, a butter flavor is preferably used in the cocoanut oil, and where this butter flavor is used, substantially 1 oz. of butter flavor is used for every 800 lbs. of oil.

When the product is removed from the fryolator it is of light brown color, and after the beans are removed from the cocoanut oil they are dried in any suitable manner such as being supported in racks, and the oil is allowed to drain back to the fryolator or frying vessel, or the beans may be placed in revolving bins or centrifuges for quickly drying them, and as before, the oil is permitted to drain back to the fryolator.

The beans are then removed from the racks and placed in a rotating screen cylinder or other agitating device and are tumbled or agitated therein to remove the skins from the bean or nut. In the cylinder a large mesh screen is employed which permits the thin skins from the nuts to fall through the screen and into a receiving bin. After the skins are removed by the rotating cylinder, the nuts may be removed from the cylinder and packaged.

It is understood that I do not wish to be limited by the process described, which is merely by way of illustration and not limitation, as variations of the process will of course be apparent to those skilled in the art without departing from the spirit of the invention or the scope of the claims.

I claim:

1. The method of processing soy beans which includes soaking the beans in a brine at substantially 70° F. until said beans have absorbed brine in an amount substantially 120% by weight, draining said beans, immersing said beans in cocoanut oil having a temperature before said immersion of substantially 410° F., raising the temperature of said cocoanut oil until but 2% or 3% of the moisture of the beans remains, drying said dehydrated beans and agitating the dried beans to remove the skins.

2. The method of processing soy beans which includes soaking the beans in brine until said beans have absorbed brine in an amount substantially 120% by weight, draining said beans, immersing said beans in cocoanut oil having a temperature before said immersion of substantially 410° F., raising the temperature of said cocoanut oil until but 2% or 3% of the moisture of the beans remains, drying said dehydrated beans and removing the skins therefrom.

3. The method of processing soy beans which includes soaking the beans in brine until said beans have absorbed brine in an amount substantially 120% by weight, draining said beans, immersing said beans in hot oil, raising the temperature of said oil until but 2% or 3% of the moisture of the beans remains, drying said dehydrated beans and removing the skins therefrom.

4. The method of processing soy beans which includes soaking the beans in brine until said beans have absorbed a substantial amount of brine, draining said beans, immersing said beans in cocoanut oil having a temperature before said immersion of substantially 410° F., raising the temperature of said cocoanut oil until but 2% or 3% of the moisture of the beans remains, drying said dehydrated beans and removing the skins therefrom.

5. The method of processing soy beans which includes soaking the beans in brine until said beans have absorbed a substantial amount of brine, draining said beans, immersing said beans in hot oil, raising the temperature of said oil until but 2% or 3% of the moisture of the beans remains, drying said dehydrated beans and removing the skins therefrom.

6. The method of processing soy beans which includes soaking the beans in brine until said beans have absorbed brine in an amount substantially 120% by weight, said brine including a sodium chloride solution of from 5% to 20%, immersing said beans in cocoanut oil having a temperature before said immersion of substantially 410° F., raising the temperature of said cocoanut oil until but 2% or 3% of the moisture of the beans remains, drying said dehydrated beans and agitating the dried beans to remove the skins.

7. The method of processing soy beans which includes soaking the beans in brine having butter flavor therein and immersing said beans in cocoanut oil having a temperature before said immersion of substantially 410° F., raising the temperature of said cocoanut oil until but 2% or 3% of the moisture of the beans remains, and drying said dehydrated beans.

8. The method of processing soy beans which includes soaking the beans in a brine at substantially 70° F. until said beans have absorbed brine in an amount substantially 120% by weight, said brine containing coloring and flavoring for absorption by said beans, draining said beans, immersing said beans in cocoanut oil having a temperature before said immersion of substantially 410° F., raising the temperature of said cocoanut oil until but 2% or 3% of the moisture of the beans remains, drying said dehydrated beans and agitating the dried beans to remove the skins.

9. The method of processing soy beans which includes soaking the beans in brine until said beans have absorbed brine in an amount substantially 120% by weight, said brine containing coloring and flavoring for absorption by said beans, draining said beans, immersing said beans in cocoanut oil having a temperature before said immersion of substantially 410° F., raising the temperature of said cocoanut oil until but 2% or 3% of the moisture of the beans remains, drying said dehydrated beans and removing the skins therefrom.

10. The method of processing soy beans which includes soaking the beans in brine until said beans have absorbed brine in an amount substantially 120% by weight, said brine containing coloring and flavoring for absorption by said beans, draining said beans, immersing said beans in hot oil, raising the temperature of said oil until but 2% or 3% of the moisture of the beans remains, drying said dehydrated beans and removing the skins therefrom.

11. The method of processing soy beans which includes soaking the beans in brine and coloring until said beans have absorbed a substantial amount of brine and coloring, draining said beans, immersing said beans in hot oil, raising the temperature of said oil until but 2% or 3% of the moisture of the beans remains, drying said dehydrated beans and removing the skins therefrom.

12. The method of processing soy beans which includes soaking the beans in brine and flavoring until said beans have absorbed a substantial amount of brine and flavoring, draining said beans, immersing said beans in hot oil, raising the temperature of said oil until but 2% or 3% of the moisture of the beans remains, drying said dehydrated beans and removing the skins therefrom.

13. The method of processing soy beans which includes soaking the beans in brine having flavoring and coloring therein, and frying the beans in hot oil until but 2% or 3% of moisture remains in the beans.

ROLLIN H. MOULTON.

DISCLAIMER 2,135,592.—*Rollin H. Moulton*, Western Springs, Ill. Soy Bean Nuts. Patent dated November 8, 1938. Disclaimer filed October 8, 1942, by the assignee, *Soy Bean Products Co.;* the inventor approving and consenting.

Hereby enters this disclaimer to claims 3, 5, 10, 11, 12, and 13.

[*Official Gazette November 3, 1942.*]

perature of said oil until but 2% or 3% of the moisture of the beans remains, drying said dehydrated beans and removing the skins therefrom.

12. The method of processing soy beans which includes soaking the beans in brine and flavoring until said beans have absorbed a substantial amount of brine and flavoring, draining said beans, immersing said beans in hot oil, raising the temperature of said oil until but 2% or 3% of the moisture of the beans remains, drying said dehydrated beans and removing the skins therefrom.

13. The method of processing soy beans which includes soaking the beans in brine having flavoring and coloring therein, and frying the beans in hot oil until but 2% or 3% of moisture remains in the beans.

ROLLIN H. MOULTON.

DISCLAIMER 2,135,592.—*Rollin H. Moulton*, Western Springs, Ill. Soy BEAN NUTS. Patent dated November 8, 1938. Disclaimer filed October 8, 1942, by the assignee, *Soy Bean Products Co.;* the inventor approving and consenting.

Hereby enters this disclaimer to claims 3, 5, 10, 11, 12, and 13.

[*Official Gazette November 3, 1942.*]